(12) United States Patent
Hwa et al.

(10) Patent No.: US 9,452,776 B1
(45) Date of Patent: Sep. 27, 2016

(54) STEERING GEAR REVERSAL CLUNK NOISE CHARACTERIZATION

(71) Applicant: GM GLOBAL TECHNOLOGY OPERATIONS LLC, Detroit, MI (US)

(72) Inventors: Ian Y. Hwa, West Bloomfield, MI (US); William K. Adams, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/734,188

(22) Filed: Jun. 9, 2015

(51) Int. Cl.
| | |
|---|---|
| B62D 5/04 | (2006.01) |
| B62D 3/12 | (2006.01) |
| B62D 15/02 | (2006.01) |

(52) U.S. Cl.
CPC .............. *B62D 5/0481* (2013.01); *B62D 3/126* (2013.01); *B62D 5/0424* (2013.01); *B62D 5/0472* (2013.01); *B62D 15/0225* (2013.01)

(58) Field of Classification Search
CPC  B62D 5/0481; B62D 5/0424; B62D 5/0472; B62D 3/126; B62D 15/0225
See application file for complete search history.

(56) References Cited

U.S. PATENT DOCUMENTS

| | | | |
|---|---|---|---|
| 7,742,899 B2 | 6/2010 | Lemont, Jr. et al. | |
| 8,789,645 B2 * | 7/2014 | Kawanaka | B62D 5/0484 180/404 |
| 2013/0211677 A1 * | 8/2013 | Oblizajek | B62D 5/046 701/42 |
| 2015/0274195 A1 * | 10/2015 | Tokura | B62D 3/126 180/443 |

* cited by examiner

*Primary Examiner* — Kevin Hurley
*Assistant Examiner* — Marlon A Arce
(74) *Attorney, Agent, or Firm* — Quinn Law Group, PLLC

(57) ABSTRACT

A method for characterizing steering gear reversal clunk noise in a steering system having a rack and a pinion gear, and electric power steering assist via a steering assist motor, includes transmitting a steering input angle control signal to a rotary actuator to rotate a steering shaft to a fixed steering angle with assist active. A linear actuator applies an axial force at a constant rate along a longitudinal axis of the rack. Axial rack acceleration is measured after imparting the axial force. A control action is executed when peak amplitude of the axial acceleration value exceeds a calibrated threshold axial acceleration value indicative of the clunk noise. A system includes the rotary actuator and steering system, a linear actuator for providing a calibrated axial apply force along the rack axis, an accelerometer for measuring an axial acceleration value of the rack, and the controller noted above.

20 Claims, 3 Drawing Sheets

STEERING GEAR REVERSAL CLUNK NOISE CHARACTERIZATION

TECHNICAL FIELD

The present disclosure relates to a method and a system for characterizing clunk noise due to steering gear reversal in a steering system.

BACKGROUND

Vehicular rack and pinion steering gears include an elongated flat gear or rack having gear teeth which mesh with mating gear teeth of a rotating pinion gear. The pinion gear is rotatably mounted on a steering shaft. As a steering angle is imparted to the steering shaft via rotation of a steering wheel, the pinion gear translates along the rack via engagement with the rack teeth. In turn, the rack translates in a corresponding steering direction. Tie rods, which are disposed at opposite distal ends of the rack, are connected to front road wheels of a vehicle via a corresponding steering arm. Therefore, steering systems using rack and pinion steering gears effectively convert rotational motion about a steering axis into axial motion of the rack while also providing a suitable level of gear reduction needed for steering a vehicle.

Steering functionality provided by typical rack and pinion steering gears may be electrically assisted in some designs. For instance, an electric steering motor may impart a variable steering torque overlay or torque assist along the steering axis, while in other designs the electric steering motor delivers torque assist directly to the rack via a drive mechanism. While manual and electrically assisted steering systems generally perform well, transient steering gear noise may manifest itself during steering direction reversal under certain driving conditions. Such noise, often referred to as steering gear reversal clunk, can impact steering quality and feel.

SUMMARY

A method and an accompanying system are disclosed herein for characterizing steering gear reversal clunk noise in a steering system of the types described above. According to the present approach, a controller is programmed to execute specific test steps, while electric steering assist is active, to determine a steering gear reversal clunk noise metric, and to ultimately enable correction of the steering gear reversal clunk noise problem based on the determined noise metric. The method proceeds by commanding, via a controller, an application of a calibrated force at a constant apply rate along a longitudinal axis of the rack, with the force referred to herein as a tie rod application force. Axial acceleration of the rack is measured and compared to a calibrated acceleration threshold. Control actions are taken with respect to the steering gear whenever the measured axial acceleration exceeds the calibrated acceleration threshold.

In a particular embodiment, the method includes transmitting a steering input angle control signal from the controller to a rotary actuator, with electric power steering assist active, to set a steering shaft at a calibrated fixed steering angle. The method also includes transmitting an axial force control signal from the controller to a linear actuator to impart a calibrated axial force at a constant apply rate along a longitudinal axis of the rack, i.e., the rack axis. Axial acceleration of the rack along the rack axis is measured via an accelerometer in response to the axial force. Thereafter, the method includes executing a control action with respect to the steering system, via the controller, whenever a peak amplitude of the measured axial acceleration exceeds a calibrated threshold acceleration indicative of an unacceptable level of steering gear reversal clunk noise.

An associated system is also disclosed. In an example embodiment, the system includes a rotary actuator, a vehicle steering system, a linear actuator, an accelerometer, and the controller noted above. The linear actuator is operable for providing a calibrated axial apply force at a calibrated constant apply rate or rates along the rack axis, while the accelerometer is operable for measuring an axial acceleration of the rack in response to the calibrated axial apply force. The controller is programmed to characterize steering gear clunk noise via execution of instructions embodying the above-described method.

Another embodiment of the method includes transmitting a steering input angle control signal from a controller to a rotary actuator to progressively set the steering shaft at a plurality of different predetermined steering angles across a predetermined range of motion of the steering shaft, e.g., a −360 degree to +360 degree range of motion. The method also includes transmitting an axial force control signal from the controller to a linear actuator to thereby impart a calibrated axial force along the rack axis at each of the different fixed steering angles, as well as measuring an axial acceleration of the rack via an accelerometer in response to the axial force. A control action is executed with respect to the steering system, via the controller, when peak amplitude of the measured axial acceleration exceeds a calibrated threshold acceleration indicative of an unacceptable level of the steering gear reversal clunk noise.

The above-noted and other features and advantages of the present disclosure will be readily apparent from the following detailed description of the embodiments and best modes for carrying out the described disclosure when taken in connection with the accompanying drawings and appended claims.

DETAILED DESCRIPTION

Figure 1:
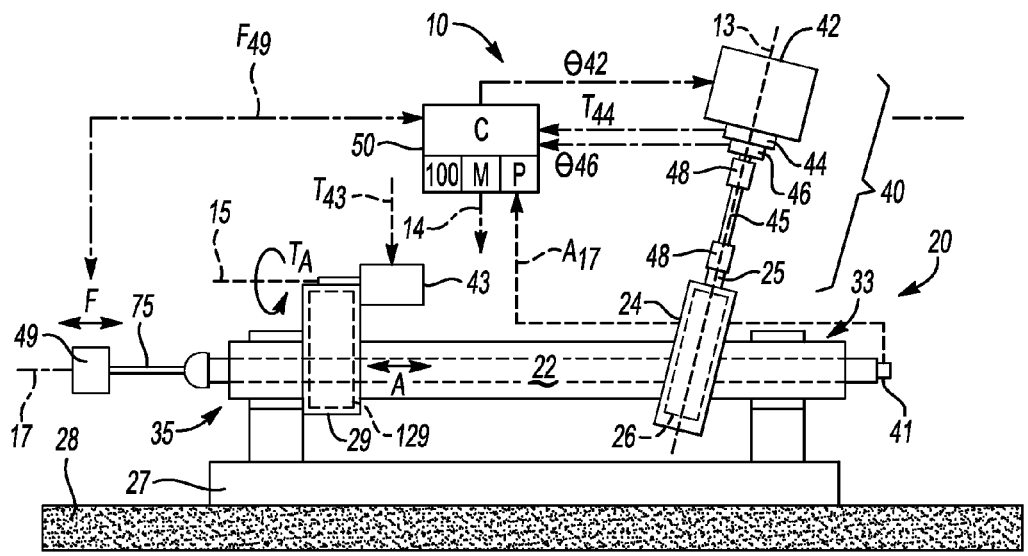
FIG. 1 is a schematic depiction of an example test system for characterizing steering gear reversal clunk noise in a steering gear as described herein.

Referring to the drawings, wherein like reference numbers refer to like components throughout the several views, an example steering test system 10 is shown schematically in FIG. 1. The steering test system 10 includes a conventional steering system 20 of the types noted above, as well as associated steering control hardware 40 and a controller (C) 50. The controller 50 is programmed to execute logic embodying a method 100 using the control hardware 40. Execution of the method 100 results in the characterization of steering gear reversal clunk noise in the steering system 20 as described in further detail below with reference to FIGS. 2A-4.

The steering system 20 of FIG. 1 may be embodied as a manual steering system or an electrically-assisted rack and pinion steering gear of the types well known in the art. As such, the steering system 20 may include an elongated, toothed rack 22 having a longitudinal rack axis 1 steering gear reversal 7 and respective first and second ends 33 and 35. The steering system 20 also includes a gear housing 24 and a steering shaft 25, with the gear housing 24 positioned proximate the first end 33 of the rack 22.

Depending on the embodiment, a drive mechanism 129 and drive housing 29 may be positioned proximate the second end 35 of the rack 22 as shown, which is typical of a rack electric power steering (EPS) system. A rotor axis 15 of the steering assist motor 43 is oriented and operable to enable electrical assist of a steering maneuver or operation through the drive mechanism 129, which may be embodied as suitable gearing, chains, belts, and/or another speed reduction mechanism. Although omitted from FIG. 1 for illustrative simplicity, the steering assist motor 43 and drive mechanism structure similar to the drive mechanism 129 and drive housing 29 may be alternatively positioned on or along the steering axis 13 so as to form a column or a pinion EPS system of the types known in the art. A column EPS embodiment may also include a steering column and an intermediate shaft, as is known in the art, with the steering assist motor 43 delivering steering assist torque to a separate drive mechanism mounted adjacent the steering column. A pinion EPS system, by way of contrast, may place the steering assist motor 43 adjacent to the gear housing 24 such that an assist torque acts directly on the rotatable pinion gear 26. Regardless of the embodiment, a fixture 27 and a base plate 28 may be used to secure the steering system 20 within a test environment.

The gear housing 24 located at the first end 33 of the rack 22 contains a rotatable pinion gear 26. As a steering input in the form of a commanded steering angle is imparted to the steering shaft 25 about the steering axis 13, typically from a steering wheel (not shown) but via a rotary actuator 42 in the present controlled test environment, the pinion gear 26 within the gear housing 24 engages mating gears (not shown) of the rack 22. The pinion gear 26 thus translates along the rack axis 17 as indicated by double-headed arrow A. This motion in turn moves the rack 22 in a corresponding direction to steer the front wheels of a vehicle (not shown) within which the steering system 20 is used.

It is recognized herein as a basis for the method 100 that steering gear reversal clunk noise may result from tolerances in the various mechanical interfaces of the steering system 20, e.g., between the mating surfaces of the pinion gear 26 and the rack 22 and/or the drive mechanism 29 and the rack 22, when a vehicle equipped with the steering system 20 is in operation. Such noise may manifest itself during steering direction reversal under certain driving conditions. The degree to which such steering gear noise manifests itself may vary with the steering angle and the rate of any tie rod forces acting axially along the axis 17 of the rack 22. The present method 100 thus takes affirmative diagnostic and control steps to replicate such conditions in a controlled test environment for the purpose of isolating and correcting the above-noted steering gear reversal clunk noise problem.

To that end, the control hardware 40 shown in FIG. 1 includes the rotary actuator 42 such as an electric motor, which is responsive to steering input angle control signals (arrow $\theta_{42}$) from the controller 50, as well as a torque transducer 44 and a rotary encoder 46, each of which is coaxially aligned with each other along the steering axis 13 of the steering shaft 25. The rotary encoder 46 is operable for transmitting a measured steering angle (arrow $\theta_{46}$) to the controller. Likewise, a measured steering output torque value (arrow $T_{44}$) is transmitted to the controller 50 by the torque transducer 46 for use in overall control of the system 10. Because axial variation may be present in the components of the control hardware 40, an extension shaft 45 may be coupled to the steering shaft 25 via a set of flexible couplings 48 as shown. The flexible couplings 48 are intended to facilitate connection of the rotary actuator 42 to the steering shaft 25.

A linear actuator 49 is disposed at end 35 of the rack 22 and connected a tie rod 75 of the steering system 20. Additionally, an accelerometer 41 is connected to the rack at end 33 opposite the linear actuator 49 as shown. The controller 50 is then placed in wired or wireless communication with each of the linear actuator 49 and the accelerometer 41, such that the controller 50 is able to transmit and receive rate-controlled axial force control signals (arrow $F_{49}$) to and from the linear actuator 49.

That is, the controller 50 of FIG. 1 is specially programmed to command a calibrated axial force along the rack axis 17, at a constant rate, and to monitor the rate and level of the applied axial force. The controller 50 is further configured to receive a measured axial acceleration value (arrow $A_{17}$) from the accelerometer 41 in response to the applied axial force along the rack axis 17. When the steering system 20 is of the electrically-assisted variety, an additional controller (not shown) such as an electronic control unit (ECU) for the steering assist motor 43 may be programmed to transmit steering torque assist control signals (arrow $T_{43}$) to the steering assist motor 43 to control a torque assist output (arrow $T_A$) of such a motor. That is, an integrated ECU on the steering assist motor 43 determines and controls the amount of torque overlay the assist motor 43 should generate based on an input torque signal from an internal torque sensor (not shown) located along the steering axis 13 and a variety of other signals, e.g., vehicle speed, ignition state, etc., as is well known in the art of EPS systems.

Figure 4:
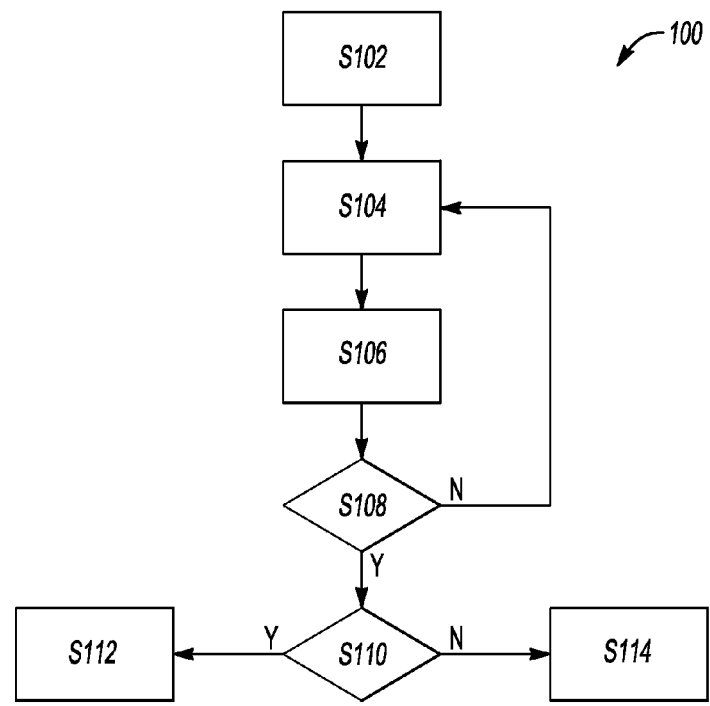
FIG. 4 is a flow chart describing an example method for characterizing steering gear reversal clunk noise in a steering system using the test system shown in FIG. 1.

The controller 50 may be configured as a host machine, e.g., a digital computer or microcomputer, that is specially programmed to execute steps of the method 100, an example of which is shown in FIG. 4. To that end, the controller 50 should include sufficient hardware to perform the required steps, with sufficient memory (M), a processor (P), and other hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like.

As will be described in further detail below with reference to FIGS. 2A-4, as part of the method 100 the controller 50 of FIG. 1 commands the rotary actuator 42 to progress in discrete stages through a predetermined range of motion/steering angles, e.g., ±360 degrees, such as in 45 degree increments, and then freezes the steering angle at each increment as testing progresses for a particular discrete steering angle. The controller 50 also transmits the axial force control signals (arrow $F_{49}$) noted above to the linear actuator 49 of FIG. 1 to command the axial forces (arrows F) along the rack axis 17 and measures the axial acceleration (arrow $A_{17}$) of the rack 22 via the accelerometer 41. Such acceleration is ideally zero in a properly functioning/noiseless steering system 20.

Figure 2A:
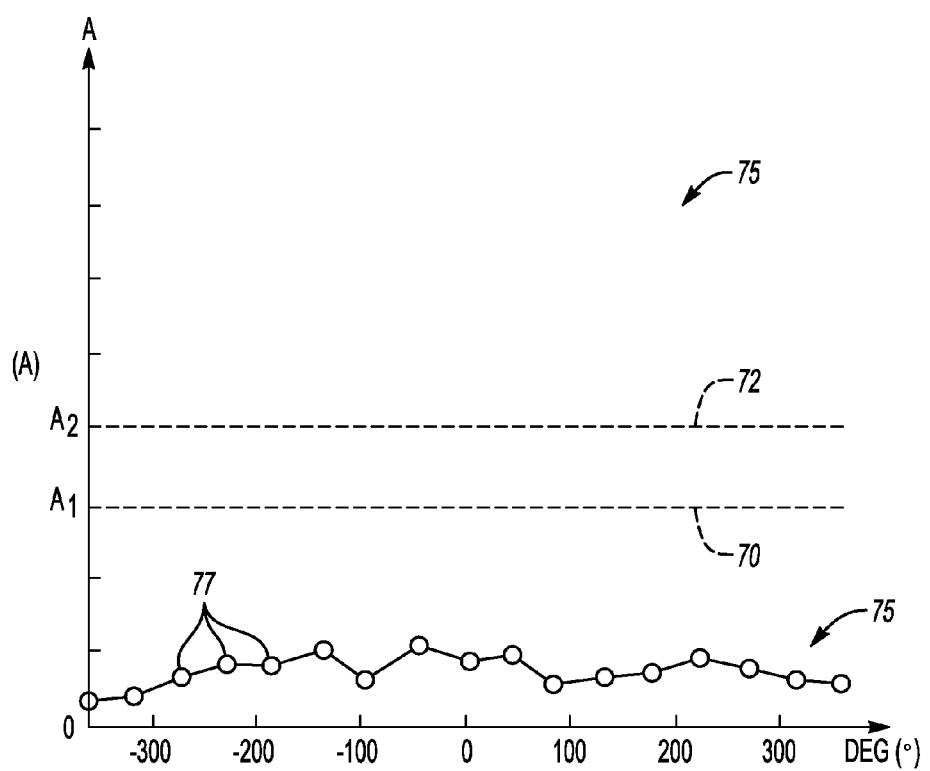
FIGS. 2A and 2B are representative time plots of respective positive and negative axial force apply rates for a satisfactorily performing steering system, with measured axial rack acceleration plotted on the vertical axis and steering input angle plotted on the horizontal axis.
Figure 2B:
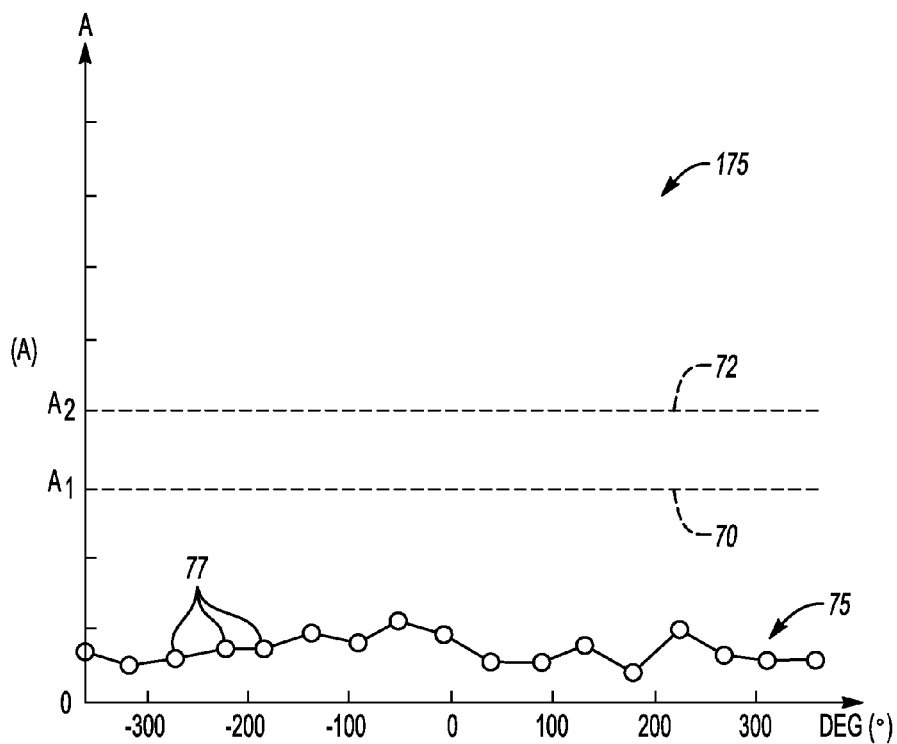

Traces 75 of FIGS. 2A and 2B illustrate example acceptable axial rack acceleration responses to the application of a calibrated axial apply force via the linear actuator 49 shown in FIG. 1, e.g., a force apply rate of about 15-25 kN/s or about 20 kN/s in different embodiments. FIGS. 2A and 2B illustrate a negative apply rate and a positive apply rate, respectively, with the terms negative and positive referring to the direction of the axial forces (arrow F) along rack axis 17 from the linear actuator 49. An amplitude (A) of the measured axial acceleration is plotted on the vertical axis and steering input angle in degrees is plotted on the horizontal axis, with various discrete data points 77 forming the traces 75. In the test, for each steering angle a range of apply rates is used, for instance 15-25 kN/s in 2 kN/s increments. The range of apply rates may be selected based on actual measured vehicle loads.

The controller 50 may use different thresholds, e.g., a first threshold 70 at amplitude $A_1$ indicating an acceptable steering clunk noise response and a second threshold 72 at a higher relative amplitude $A_2$ indicating an unacceptable clunk noise response. The area between the first and second thresholds 70 and 72 may be as large or small as desired for the given test being conducted, e.g., about 0.05 to 1 G in a possible embodiment. In FIGS. 2A and 2B, all measured axial acceleration values fall well below the level of the first threshold 70, and thus a steering system 20 exhibiting the illustrated performance characteristics would be deemed acceptable as part of any resultant control decision.

Figure 3A:
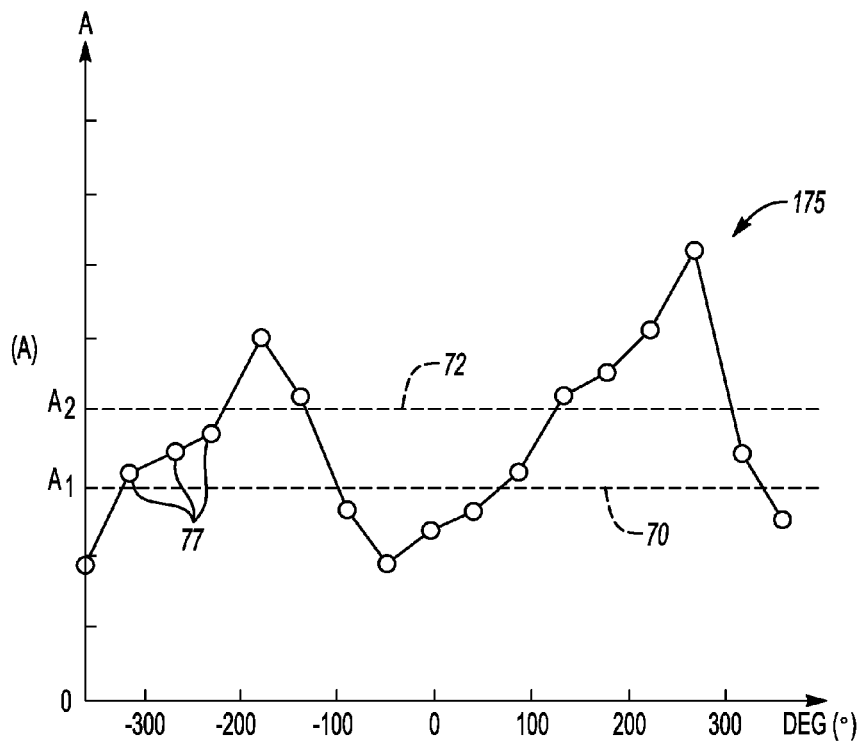
FIGS. 3A and 3B are representative time plots of respective positive and negative axial force apply rates for an unsatisfactorily performing steering system, with measured axial rack acceleration plotted on the vertical axis and steering input angle plotted on the horizontal axis.
Figure 3B:
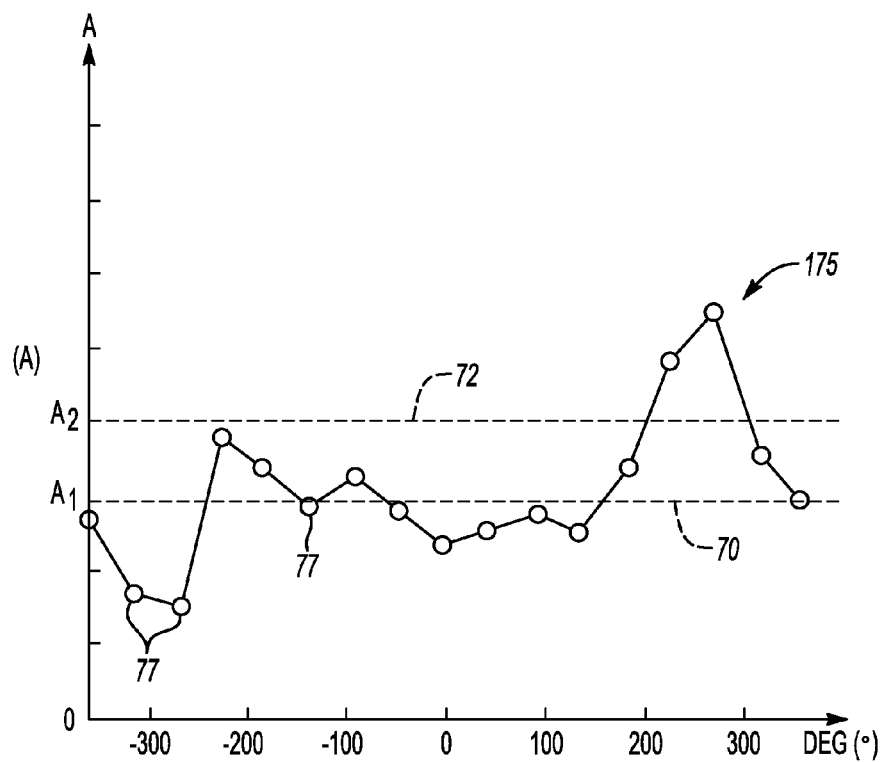

By way of contrast to FIGS. 2A and 2B, traces 175 of FIGS. 3A and 3B depict example unacceptable rack acceleration responses. Traces 175 have values lying above the second threshold 72. Also, the acceleration response shown for the positive apply rate in FIG. 3B differs from that of the negative apply rate of FIG. 3A, which is an indication that the direction of force apply along the rack axis 17 may also influence any gear reversal clunk noise that ultimately manifests itself during the test. FIGS. 2A-3B therefore demonstrate that the method 100 proceeds by measuring an axial acceleration response of the rack 22 at each of a plurality of different discrete or fixed steering angle set points through the predetermined range of motion of the steering shaft 25 as controlled during execution of the method 100 by the rotary actuator 42 in response to commands from the controller 50.

Referring to FIG. 4, an example embodiment of the method 100 for characterizing steering gear reversal clunk noise in a steering system such as the example steering system 20 of FIG. 1 begins with step S102. At this step, the steering system 20 is connected to the control hardware 40 and placed in communication with the controller 50 described above. In addition to connecting the controller 50 to the rotary actuator 42, step S102 includes connecting the linear actuator 49 and the accelerometer 41 along the rack axis 17. The method 100 proceeds to step S104 once the test system 10 has been constructed substantially as shown in FIG. 1 and the controller 50 is in communication with the rotary actuator 42, the linear actuator 49, and the accelerometer 41. For EPS systems, electronic steering assist is active throughout the test. In addition, since steering gear reversal clunk noise is typically most noticeable during low-speed parking lot maneuvers, the simulated vehicle speed may be about 0 KPH, which corresponds to a maximum level of steering assist. Thus, electric power steering assist is active through the test.

At step S104, the controller 50 transmits the steering input angle control signal (arrow $\theta_{42}$) to the rotary actuator 42 of FIG. 1 to thereby cause the rotary actuator 42 to rotate the steering shaft 25 to a first steering angle set point, e.g., −360 degrees, and then freezing or holding this first steering angle set point. As is known in the art, once an electric motor is not energized, its rotor can be locked, e.g., via a lockup clutch or other suitable mechanical or electrical means, to ensure the imparted steering angle is held fixed. The method 100 proceeds to step S106 once the steering shaft 25 has been rotated to the first steering angle set point.

Step S106 includes commanding a calibrated axial apply force via transmission of the axial force control signals (arrow $F_{49}$) to the linear actuator 49 of FIG. 1 at a constant apply rate. The value of the constant-rate axial apply force should be high enough to cause a measurable response at the end 33 of the rack 22, for instance about 15-25 kN/s or about 20 kN/s in non-limiting example embodiments. Step S106 also includes measuring the axial acceleration of the rack 22 via the accelerometer 41 and transmitting the measured axial acceleration to the controller 50 as the measured axial acceleration value (arrow $A_{17}$). The method 100 then proceeds to step S108.

At step S108, the controller 50 of FIG. 1 next determines whether all desired steering angle set points have been tested. For example, if a full angular range of motion of ±360 degrees is divided into equal 45 degree increments, the controller 50 determines at step S108 whether all positive and negative apply rate directions have been tested for each of the steering angle set points, i.e., the value set [−360°, −315°, −270°, . . . , +270°, +315°, +360°] in the 360° example has been tested, for a total of at least seventeen different steering angles in this example. If so, the method 100 proceeds to step S110. Step S104 is otherwise repeated for the next steering angle set point.

Step S110 of method 100 may include determining whether the test results from steps S102-S106 correspond to a passing/acceptable or failing/unacceptable steering system 20. The performance criteria used for step S110 may vary with the design. For instance, in viewing the example unacceptable response of FIGS. 3A and 3B, the controller 50 may determine whether any acceleration measurements exceed the second threshold 72. Alternatively, the controller 50 may determine how many measurements exceed the second threshold 72 and by how much the second threshold 72 is exceeded in determining whether or not a given test sample should be considered acceptable or not. The method 100 proceeds to step S112 if the sample is unacceptable, and to step S114 if the sample is acceptable.

Step S112 includes executing a control action with respect to the steering system 20 of FIG. 1 when the prior steps lead to a decision that the steering system 20 has an unacceptable performance. For instance, the controller 50 of FIG. 1 may record a first diagnostic code as an output signal, indicated by arrow 14 of FIG. 1, when the measured acceleration (arrow $A_{17}$) exceeds the calibrated threshold acceleration noted above with reference to step S108, i.e., peak acceleration indicative of unacceptable steering gear reversal clunk noise for the particular steering system 20 being tested. Additional control steps may entail using the first diagnostic code to validate a given design of the steering system 20, such as by rejecting a given design in a design validation process when the diagnostic code is recorded or building a design specification.

Step S114 is reached when the measured amplitude of the received measured acceleration exceeds the calibrated threshold acceleration, or in other words, when no perceptible condition is detected in steps S102-S106 via testing though the entire range of motion of the steering shaft 25. Step S114 may entail recording a second diagnostic code via the controller 50 as indicated by arrow 14 of FIG. 1 when the peak amplitude of the received measured axial acceleration does not exceed the calibrated threshold noted above with reference to step S108. As step S114 indicates a properly-functioning steering system 20, additional control steps may entail using the second diagnostic code to validate a given design of the steering system 20, such as by accepting a given design in a validation process or building a design specification.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for characterizing steering gear reversal clunk noise in a steering system having a rack and a pinion gear, with the pinion gear disposed on an end of a steering shaft in meshed engagement with the rack, and a steering assist motor operable for electrically assisting a steering maneuver, the method comprising:
electrically assisting the steering maneuver via the steering assist motor;
transmitting a steering input angle control signal from a controller to a rotary actuator to thereby set the steering shaft at a calibrated steering angle;
transmitting an axial force signal from the controller to a linear actuator to thereby impart a calibrated axial force along a longitudinal axis of the rack at a constant apply rate;
measuring an axial acceleration value of the rack along the longitudinal axis via an accelerometer after imparting the calibrated axial force; and
executing a control action with respect to the steering system, via the controller, when a peak amplitude of the measured axial acceleration value exceeds a calibrated threshold axial acceleration value indicative of an unacceptable level of the steering gear clunk noise.

2. The method of claim 1, wherein transmitting a steering input angle control signal includes commanding the rotary actuator to progressively rotate the steering shaft to a plurality of different fixed steering angles across a full range of motion of the steering shaft.

3. The method of claim 2, wherein the plurality of different fixed steering angles range from −360 degrees to +360 degrees in 45 degree increments.

4. The method of claim 1, wherein the constant apply rate is about 15-25 kN/s.

5. The method of claim 1, wherein the calibrated threshold axial acceleration value indicative of the steering gear reversal clunk noise is at least about 0.2 G.

6. The method of claim 1, wherein executing a control action includes recording a diagnostic code in memory of the controller.

7. The method of claim 6, wherein executing a control action includes rejecting the steering system in a design validation process when the diagnostic code is recorded.

8. A system comprising:
a rotary actuator responsive to a steering input angle control signal;
a steering system having a steering shaft, a rack having a longitudinal axis, a pinion gear disposed on an end of the steering shaft in meshed engagement with the rack, and a steering assist motor operable for assisting a steering maneuver;
a linear actuator operable for providing a calibrated axial apply force along the longitudinal axis of the rack at a constant apply rate;
an accelerometer operable for measuring an axial acceleration of the rack along the longitudinal axis in response to application of the calibrated axial apply force; and
a controller programmed to characterize steering gear reversal clunk noise in the steering system, wherein execution of instructions by the controller causes the controller to:
transmit the steering input angle control signal to the rotary actuator, while the steering assist motor assists the steering maneuver, to thereby set the steering shaft at a calibrated fixed steering angle;
transmit an axial force signal to the linear actuator to thereby impart a calibrated axial force along the longitudinal axis of the rack at a constant apply rate;
measure an axial acceleration value of the rack via an accelerometer after imparting the calibrated axial force; and
execute a control action with respect to the steering system when a peak amplitude of the measured axial acceleration value exceeds a calibrated threshold axial acceleration value indicative of an unacceptable level of the steering gear reversal clunk noise.

9. The system of claim 8, wherein the rack has a first end and a second end, and wherein the linear actuator and the accelerometer are disposed at the first and second end, respectively.

10. The system of claim 8, wherein the controller is programmed to command the rotary actuator to progressively rotate the steering shaft to each of a plurality of different fixed steering angles across a calibrated range of motion of the steering shaft.

11. The system of claim 10, wherein the calibrated range of motion is ±360° and the plurality of different fixed steering angles ranges includes seventeen fixed steering angles.

12. The system of claim 8, wherein the calibrated axial force is applied at a rate of about 15-25 kN/s.

13. The system of claim 8, wherein the calibrated threshold axial acceleration value indicative of the steering gear reversal clunk noise is at least about 0.2 G.

14. The system of claim 8, wherein the control action includes recording a diagnostic code in memory of the controller.

15. The system of claim 14, wherein executing a control action includes rejecting the steering system in a design validation process when the diagnostic code is recorded.

16. A method for characterizing steering gear reversal clunk noise in a steering system having a rack and a pinion gear disposed on an end of a steering shaft in meshed engagement with the rack and a steering assist motor operable for electrically assisting a steering maneuver, the method comprising:
    transmitting a steering input angle control signal from a controller to a rotary actuator, while the steering assist motor is electrically assisting the steering maneuver, to thereby progressively rotate the steering shaft to a plurality of different fixed steering angles across a −360 degree to +360 degree range of motion of the steering shaft;
    transmitting an axial force signal from the controller to a linear actuator to thereby impart a calibrated axial force along a longitudinal axis of the rack, at a constant apply rate, for each of the different fixed steering angles;
    measuring an axial acceleration value of the rack via an accelerometer in response to imparting the calibrated axial force; and
    executing a control action with respect to the steering system, via the controller, when a peak amplitude of the measured axial acceleration value exceeds a calibrated threshold acceleration value indicative of an unacceptable level of the steering gear noise.

17. The method of claim 16, wherein the plurality of different fixed steering angles includes at least seventeen different steering angles.

18. The method of claim 16, wherein the calibrated axial force is applied at a rate of about 15-25 kN/s and the calibrated threshold axial acceleration value indicative of the steering gear reversal clunk noise is at least about 0.2 G.

19. The method of claim 16, wherein executing a control action includes recording a diagnostic code in memory of the controller.

20. The method of claim 19, wherein executing a control action includes rejecting the steering system in a design validation process when the diagnostic code is recorded.

* * * * *